March 8, 1960

E. R. OVERMAN 2,927,742

ROLL-UP MACHINE

Filed Nov. 15, 1956

INVENTOR.
EARL R. OVERMAN, DECEASED
BY MARY B. OVERMAN, ADMINISTRATRIX
BY

Harold B. Hood
ATTORNEY.

INVENTOR.
EARL R. OVERMAN, DECEASED
BY MARY B. OVERMAN, ADMINISTRATRIX
BY
Harold B Hood
ATTORNEY.

INVENTOR.
EARL R. OVERMAN, DECEASED
BY MARY B. OVERMAN, ADMINISTRATRIX
BY Harold B Hood,
ATTORNEY.

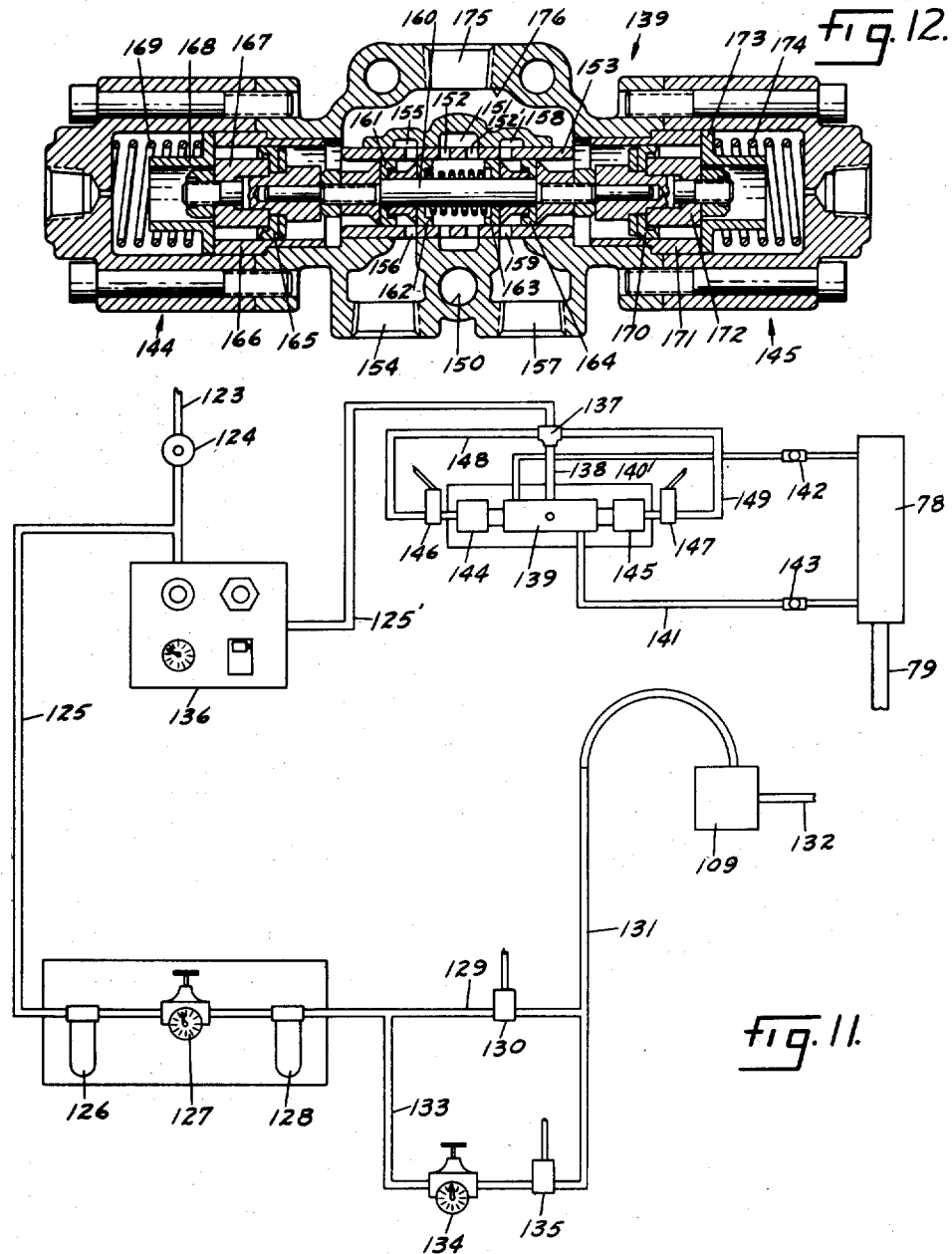

United States Patent Office 2,927,742
Patented Mar. 8, 1960

2,927,742

ROLL-UP MACHINE

Earl R. Overman, deceased, late of Wabash, Ind., by Mary B. Overman, executrix, Wabash, Ind., assignor to Rock Wool Engineering and Equipment Company, Inc., Wabash, Ind., a corporation of Indiana Application November 15, 1956, Serial No. 622,417

17 Claims. (Cl. 242—55.1)

The present invention relates to a roll-up machine for reasonably flexible material of reasonable tensile strength such as, for instance, mineral wool batt. The machine has been designed, and will be described, primarily for handling such batt material; but it will be obvious that it will be equally effective in the handling of other types of materials having the above characteristics.

As illustrated, the machine is designed to handle a continuous stream of such material supplied, for instance, by a producing station; but it will be clear that it could, as well, handle such material in separate pieces, in a continuous stream from a storage roll, or in many other sets of conditions.

The primary object of the invention is to provide a mechanism whereby a predetermined length of material will be formed into a roll and will thereupon be automatically discharged from the roll-up machine. A further object is to provide such a mechanism in which each piece of material so to be formed will be automatically started into a roll form, without attention from an operator or an attendant.

A further object of the invention is to provide, in such a machine, means whereby the material being formed into a roll will be driven wholly or primarily through forces applied to its external surface, whereby speed variation in the driving means is rendered unnecessary during the build up of the roll of material.

A still further object of the invention is to provide novel means for maintaining a compacting pressure upon the material, as it is built up into a roll, through the medium of means engaging substantially diametrically opposite regions on the building roll together with means responsive to progressive increase in the diameter of rolled material, to shift such engaging means progressively equally and oppositely away from the axis of the building roll.

A still further object of the invention is to provide, in connection with a mandrel upon which the roll is built novel means, automatically actuated when the trailing end of a piece of material being rolled passes a given point, for withdrawing the mandrel from supporting relation with the roll of material, whereby such roll will be discharged from the machine. A further object of the invention is to provide means, automatically actuated concurrently with initiation of such mandrel-withdrawing action, to shift the pressure-applying means out of the way of the rolled material, to facilitate such discharge thereof from the machine.

A still further object of the invention is to provide means, automatically controlled, for driving such a mandrel, during the initial stages of a roll-up cycle, at a peripheral velocity substantially equal to the lineal velocity of the advancing material to be rolled, and for subsequently applying to the mandrel, during the major portion of the roll-up cycle, only a sufficient driving force to relieve the material being rolled up from the effect of drag which would be exerted thereon by an undriven mandrel.

A still further object of the invention is to provide automatic controls for a machine of the character above described.

Additional objects and accomplishments of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 7 is an elevation taken from the left end of Fig. 5;

Fig. 11 is a fluid flow diagram;

Fig. 12 is an enlarged section through a control valve system for the motor which dominates the position of the presser and material driving mechanism.

Figure 1:
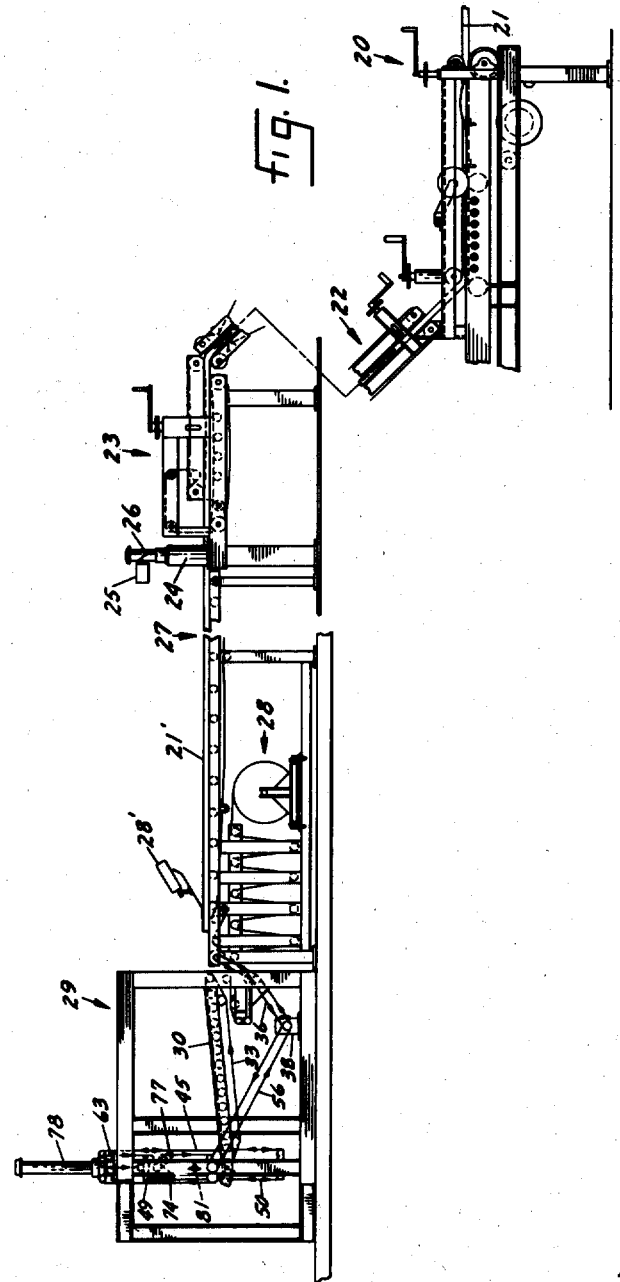
Fig. 1 is a diagrammatic illustration of an installation through which material such as rock wool passes, from a fiberization station, through batting means, compacting means, cut-off means and accelerating means to the roll-up machine of the present invention.

Referring more particularly to the drawings, it will be seen that, in Fig. 1, I have illustrated a conventional batting station 20 receiving a continuous stream of mineral wool, or the like, 21. The stream 21 is encased in a paper sheath at the station 20, in accordance with conventional practice, and is thence carried, upon an inclined conveyor 22 which compacts and shapes the stream, to a feed conveyor 23.

At the discharge end of the feed conveyor 23 is located a cut-off mechanism 24 of conventional type, adapted to be actuated at predetermined intervals by conventional measuring means (not shown) to sever the advancing stream. A normally open switch 25 is associated with the cut-off means 24 and has an actuating arm 26 which is engaged, upon completion of the cycle of the cut-off means, momentarily to close the switch 25 for a purpose to appear. As illustrated, the cut-off mechanism 24 comprises a reciprocating knife, and the arm 26 will be actuated, as above, by means moving with the knife to engage the arm 26 upon the return stroke of the knife.

Beyond the cut-off mechanism 24 is disposed a live roll conveyor 27 to receive and advance material delivered thereto from the station 23; and, in Fig. 1, I have indicated a wrapper-delivery means 28 which may be periodically actuated, to deliver a gummed wrapper sheet of predetermined length to the roll-up mechanism 29 when the trailing end of a severed piece of material 21' is drawn past the feeler paddle of a control switch 28'. This wrapper-delivery mechanism forms no part of the present invention and is not further illustrated or described herein.

The roll-up mechanism indicated generally by the reference numeral 29 is positioned to receive successive pieces 21' of material from the conveyor 27. As is more fully illustrated in Figs. 2, 3 and 4, such mechanism includes a conveyor comprising a frame 30 having one end mounted for oscillation about a horizontal axis 31, and carrying a series of live rolls 32. Each of such rolls carries a sprocket, and an endless chain 33 meshes with said sprockets and with a drive sprocket on the shaft 31. A chain 34 drives the shaft 31 from a shaft 35 which, in turn, is driven by a chain 36 from the output shaft 37 of a gear reducer 38 driven from an electric motor 39. A further chain 34' drives from the shaft 35 to a shaft of the conveyor 27 from which a further chain (not shown) drives the live rolls of the conveyor 27.

The outermost roll 32 is fixed to a shaft 40 which, through a chain 41, is connected to drive a further shaft 42 carried on the frame 30. It will be noted (Figs. 2 and 3) that the shaft 42 is disposed on an axis slightly above that of the shaft 40. A still further shaft 44, still more remote from the pivotal axis 31, is disposed at a slightly higher level; and a series of friction belts 43, axially spaced from each other, is trained over the shafts 42 and 44, as most clearly illustrated in Figs. 3 and 4, said belts having a driving connection with at least the shaft 42.

Figure 2:
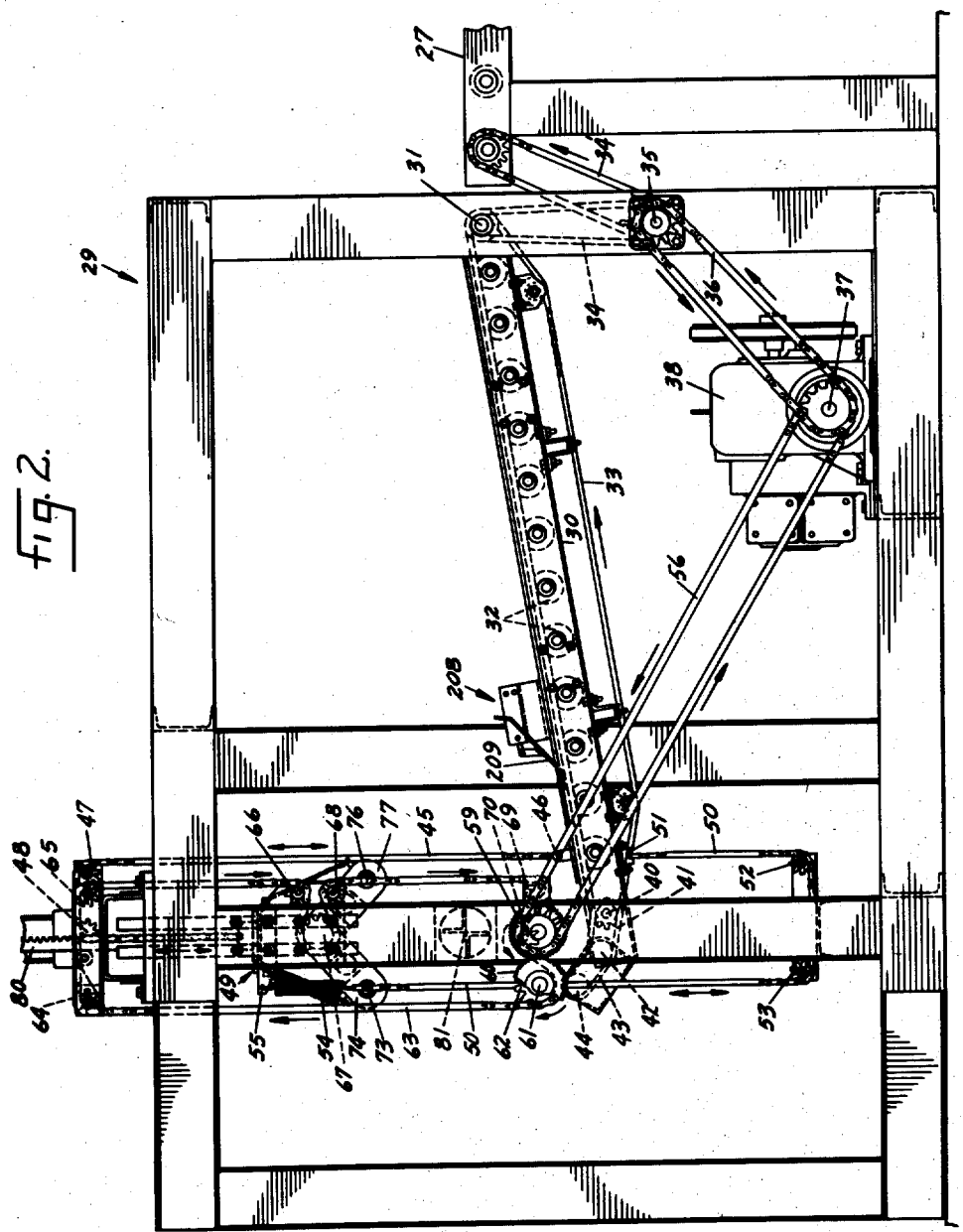
Fig. 2 is an enlarged side elevation of such a roll-up machine.
Figure 3:
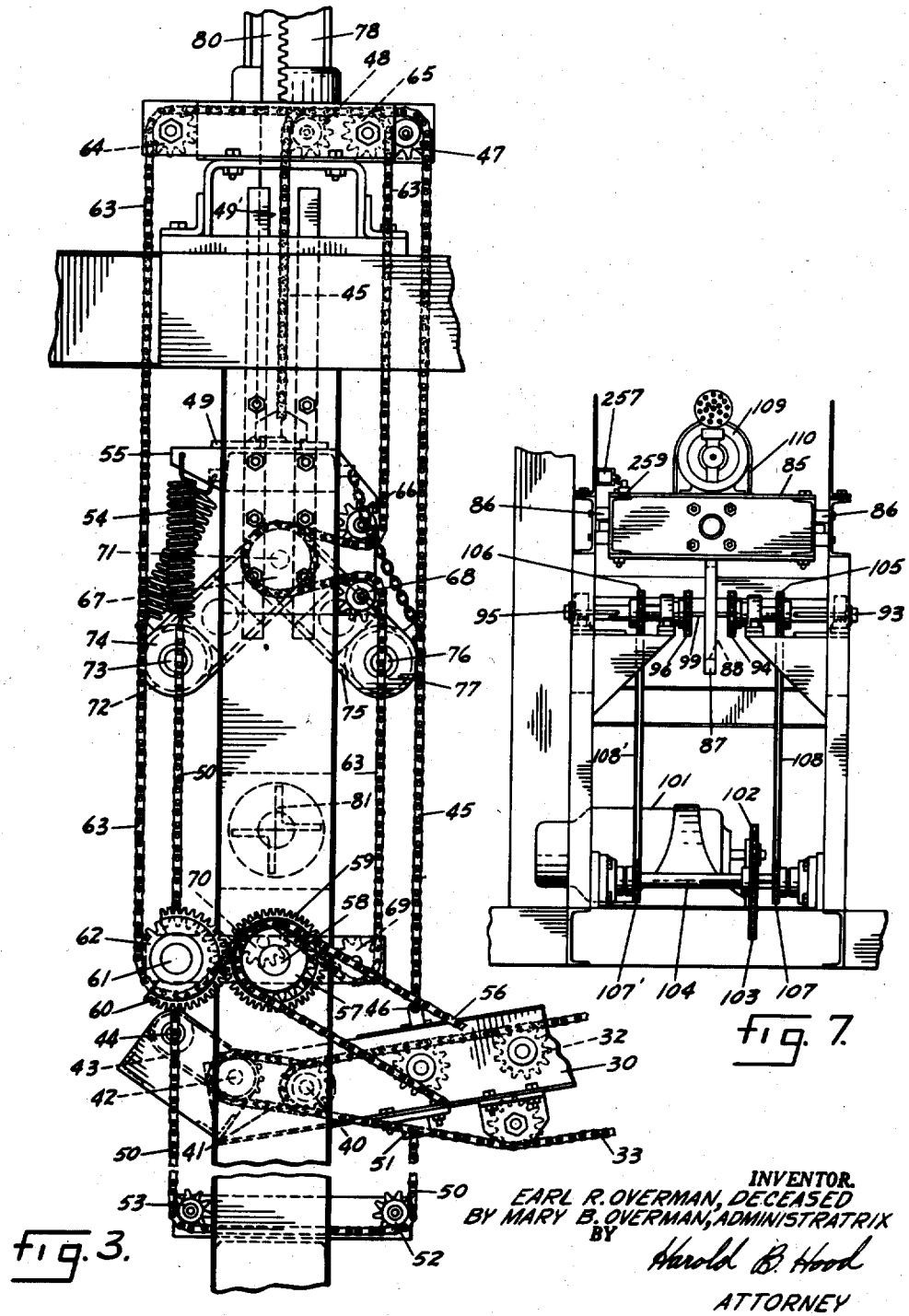
Fig. 3 is a further enlarged side elevation of the mandrel and presser and material driving means of the present invention, parts being broken away for clarity of illustration.

It will thus be apparent that, through the chains 36, 34, 33 and 41, all of the rolls 32, and the shaft 42, will be driven in a common direction and at a common velocity so that material supported upon said rolls will be advanced toward the left as viewed in Fig. 2. It will also be apparent that the belts 43 will act upon such material to guide the same upwardly, for a purpose which will appear hereinafter.

At each lateral side of the frame 30, and near the distal end thereof, a chain 45 (Figs. 2, 3 and 4) is secured to a bracket 46 on said frame; and each such chain is led upwardly and trained over a sprocket 47 and a sprocket 48 supported on the main frame of the machine, and thence extends downwardly to be anchored upon a carriage 49 mounted for reciprocation in guideways 49' provided by the machine frame. Similarly, at each side of the machine, a chain 50 is anchored to a bracket 51 on the lower surface of the frame 30 and is led downwardly, around sprockets 52 and 53 supported on the machine frame, and thence upwardly to be connected, through a coiled spring 54, with a bracket 55 on the carriage 49. As will be clear from an inspection of Figs. 2 and 3, the sprockets 47 and 48 are journalled on axes located above the uppermost position of the carriage 49 and the sprockets 52 and 53 are journalled on axes located below the lowermost position of the distal end of the frame 30.

A chain 56 provides a driving connection between the output shaft 37 of the gear 38 and a sprocket 57 mounted on a shaft 58 journalled on the main frame of the machine. Said shaft 58 carries also a gear 59 meshing with a gear 60 fixed to a shaft 61, likewise journalled on the machine frame, and carrying a sprocket 62. An endless chain 63 is trained around the sprocket 62, a sprocket 64 journalled on a fixed axis above the uppermost position of the carriage 49, a sprocket 65 journalled on a fixed axis above the uppermost position of the carriage 49, a sprocket 66 journaled on said carriage, a sprocket 67 journalled on said carriage, a sprocket 68 journalled on said carriage, a sprocket 69 journalled on a fixed axis on the frame, and a chain-tightening sprocket 70 journalled on an adjustable axis on the machine frame. Obviously, the chain 63 will be continuously driven, from the chain 56, through the sprocket 57, shaft 58, gear 59, gear 60, shaft 61 and sprocket 62.

The sprocket 67 is fixed to a shaft 71 journalled in, and spanning, the carriage 49. As is most clearly illustrated in Fig. 4, a series of axially spaced belts 72 is trained about the shaft 71 and about a shaft 73 journalled in a pair of arms 74 mounted for oscillation about the axis of the shaft 71. As is most clearly seen in Figs. 2 and 3, said arms extend downwardly and to the left from the vertical plane including the axis of the shaft 71. A similar series of belts 75 is trained about the shaft 71 and about a further shaft 76 journalled in a pair of arms 77 mounted for oscillation about the axis of the shaft 71 and extending downwardly and to the right as viewed in Fig. 3, from said vertical plane. The belts 72 and 75 are drivingly engaged with the shaft 71 so that, as said shaft is driven in a counter-clockwise direction as viewed in Fig. 3, the lower runs of the belts 72 will be driven upwardly and to the right while the lower runs of the belts 75 will be driven downwardly and to the right.

It will be obvious, additionally, that the drive means for the shaft 71 will be operative regardless of the position of the carriage 49 in its guideway. The action will be most clearly apparent if it be conceived that the carriage 49 is moved at a time when the chain 63 is stationary. Under such circumstances, upward movement of the carriage 49 will cause the sprockets 66, 67 and 68 to move upwardly along the length of the chain 63, resulting in clockwise movement of the sprockets 66 and 68 and in counter-clockwise movement of the sprocket 67 and shaft 71, while downward movement of the carriage will produce clockwise movement of the sprocket 67 and shaft 71. While similar adjustment of the carriage 49 during operation of the mechanism will produce a slight, momentary acceleration or deceleration of the shaft 71 (depending upon the direction of movement of the carriage) such momentary changes in velocity will be of such slight magnitude that they may be ignored in the operation of the mechanism as a whole.

A fluid motor is provided for controlling the position of the carriage 49, said motor comprising a cylinder 78 fixedly mounted on the machine frame and in which is mounted a reciprocable piston having a rod 79 secured to the carriage 49. As is most clearly seen in Fig. 4, a rack 80 is fixed to the carriage 49 adjacent each side thereof, said racks meshing with pinions (not shown) fixed to a shaft journalled in the machine frame, to guard against canting of the carriage during movement thereof.

A mandrel 81 is journalled in the machine frame upon a horizontal axis. Upon inspection of Figs. 2 and 4, it will be apparent that the distal end of the conveyor 30 is disposed below the horizontal plane including the axis of the mandrel 81, while the presser unit comprising the carriage 49, the shafts 71, 73 and 76 and the belts 72 and 75, is disposed above that plane. It will also be apparent that the conveyor is so constructed and arranged that it tends to move material downwardly and toward the left in a region to the right of the common vertical plane including the axis of the mandrel 81 and the axis of the shaft 71, and upwardly and to the left in a region on the left-hand side of that vertical plane; while the pressure means tends to move material upwardly and to the right in a region on the left-hand side of that vertical plane and downwardly and to the right in a region on the right-hand side of that vertical plane.

Figure 4:
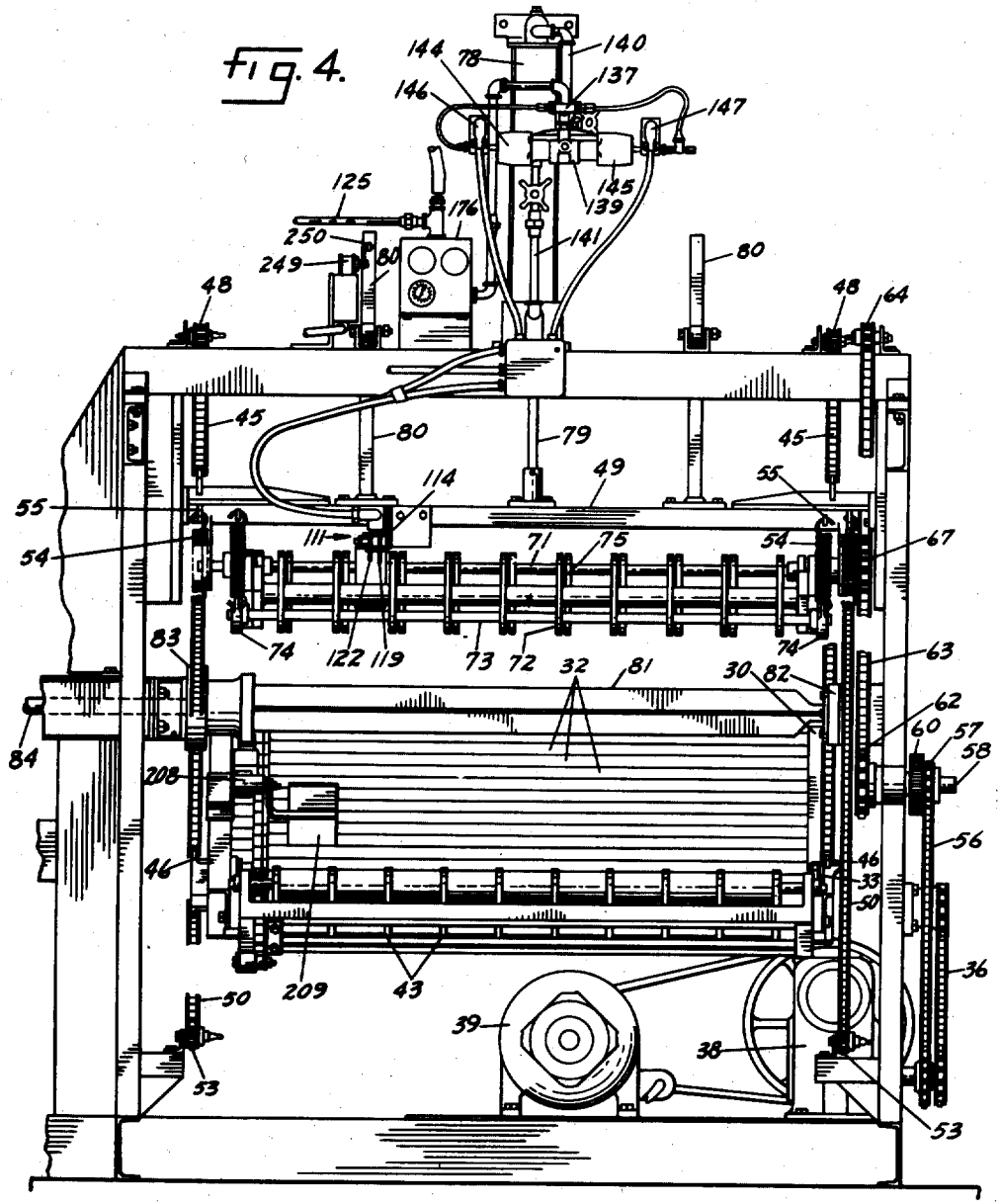
Fig. 4 is an end elevation taken from the left of Fig. 2.

Referring, now, to Figs. 4, 5, 6 and 7, it will be seen that the right-hand end of the mandrel 81, as viewed in Fig. 4, is supported in bearing means 82 carried on the machine frame, a reduced tip of said mandrel being removably seated in said bearing means. When the mandrel tip is so seated, the mandrel is in cooperative registry with the conveyor and the pressure means. Near the left-hand end of the machine, the mandrel passes through, and is supported in, an intermediate bearing 83 through which the mandrel is axially slidable. Beyond the intermediate bearing means 83, the mandrel is formed as a shaft 84, the left-hand end of which is journalled in, and held against axial movement relative to, a bearing 84' fixedly supported on a carriage 85 mounted for reciprocation in a trackway 86 which extends away from the bearing means 82 in the direction of the axis of said shaft 84. Depending from the carriage 85 is a bracket 87 formed with a vertical slot 88.

A shaft 89 is supported in suitable bearings on the machine frame near one end of the trackway 86, and carries a sprocket 90. Another shaft 91, coaxial with the shaft 89, carries a sprocket 92 somewhat spaced from the sprocket 90.

Near the opposite end of the trackway, and in the same horizontal plane with the shafts 89 and 91, are journalled a shaft 93 carrying a sprocket 94 and a coaxial shaft 95 carrying a sprocket 96 spaced from the sprocket 94. A continuous chain 97 is trained over the sprockets 90 and 94, and a continuous chain 98 is trained over the sprockets 92 and 96.

A pin or rod 99 (Figs. 5 and 7) is drivingly connected between corresponding links of the chains 97 and 98 and carries a slide, block or roller 100 which is operatively engaged in the slot 88 of the bracket 87. Thus, the chains 97 and 98 are connected to drive the carriage 85 between opposite ends of the trackway 86.

An electric motor 101 is connected by a chain 102 to drive a sprocket 103 fixed to a shaft 104 spanning the trackways 86; and sprockets 107 and 107' are fixed to said shaft 104 in coplanar relation with a sprocket 105 on the shaft 93 and a sprocket 106 on the shaft 95, respectively; and chains 108 and 108' are trained, respectively, about the sprockets 105 and 107 and the sprockets 106 and 107'. Thereby, when the motor 101 is energized, the chain 97 will be driven through the chain 102, sprocket 103, shaft 104, sprocket 107, sprocket 105, shaft 93 and sprocket 94, while the chain 98 will be driven, at the same velocity and in the same direction, through the chain 102, sprocket 103, shaft 104, sprocket 107', chain 108', sprocket 106, shaft 95, and sprocket 96 to drive the carriage 85 along the trackways. As will be obvious, on inspection of Fig. 5, the direction of rotation of the motor 101 makes no difference. When the motor is energized, in either direction, the pin 99 will be moved to the left, from its illustrated position, until it has moved half way around the sprockets 94 and 96, whereafter it will be moved to the right until it resumes its illustrated position; and the carriage 85, of course, will follow such movement of the pin 99.

A selective speed motor 109 is supported on the carriage 85 and is connected, through a chain 110, to drive the shaft 84 which is an extension of the mandrel 81. In the illustrated embodiment of the invention, the motor 109 is a rotary, fluid motor, energized and controlled in a manner to be described hereinafter.

Supported from the carriage 49 is a feeler unit, indicated generally by the reference numeral 111, and including an arm 112 pivotally mounted intermediate its ends upon a pivot 113 fixed to a bracket 114 which, in turn, is secured to the carriage 49 (Figs. 4 and 8 to 10). One end 115 of the arm 112 is suitably bent and curved and is so disposed as to bias the arm 112 in a counterclockwise direction so that it will ride upon the outer surface of a mass of material 116 being wound upon the mandrel 81. The arrangement is such that, when the mandrel 81 is empty, or when the radial thickness of material thereon is such that an insufficient amount of pressure is exerted on such material by the belts 43, 72 and 75, the arm 112 will hang in the position of Fig. 8. Mounted on the bracket 114 is a normally open limit switch 117 having an actuating arm 118 so disposed in the path of a finger 119 on one end of the arm 112 as to be moved to switch-closing position by the finger 119 when the arm 112 assumes the position of Fig. 8. Likewise mounted on the bracket 114 is a second normally open limit switch 120 having an actuating arm 121 so disposed as to be engaged and moved to switch-closing position by a finger 122 on the opposite end of the arm 112, when the arm assumes the position of Fig. 10. The parts are so proportioned and designed that, in the intermediate position of the arm 112 illustrated in Fig. 9, both switches 117 and 120 remain open. The fingers 119 and 122 may preferably be threaded pins longitudinally adjustable, independently, relative to the arm 112, as suggested in Fig. 4. The function and mode of operation of the feeler mechanism will be explained in detail hereinafter.

In Fig. 11, I have diagrammatically illustrated the fluid-flow system of the present invention. A conduit 123 leads from a suitable source of supply of fluid under pressure (preferably air) and is dominated by a master valve 124. A conduit 125, opening into the conduit 123 on the downstream side of the valve 124, leads through a filter 126, an adjustable pressure regulator 127, and a lubricator 128 to a conduit 129, dominated by an electrically actuated, normally closed valve 130 and thence, through a conduit 131, to the motor 109 (Figs. 5, 6 and 7) which is provided with exhaust means 132.

By-passing the valve 130 is a branch conduit 133 leading through a second adjustable pressure regulator 134 and dominated by a normally closed, electrically actuated valve 135.

A further conduit 125' leads from the valve 124 through a filter-regulator-lubricator unit 136 to a T-fitting 137 whence a conduit 138 leads to the inlet 150 of a valve 139.

The valve 139, illustrated in detail in Fig. 12, is of conventional construction, and conduits 140 and 141 lead, respectively, from the two delivery ports of said valve through needle valves 142 and 143 to the upper and lower ends of the cylinder 78. Pilot motors 144 and 145, respectively controlled by normally closed, electrically actuated valves 146 and 147 in lines 148 and 149 leading oppositely from the T 137, control the operation of the valve 139. The construction of the valve 139 is such that, when both valves 146 and 147 are closed, both ends of the motor cylinder 78 will be sealed against fluid flow to or from said cylinder; when the valve 146 is open, fluid will be supplied from the source to the lower end of the cylinder 78 and will be exhausted from the upper end thereof; and when the valve 147 is open, fluid will be supplied from the source to the upper end of the cylinder 78 and will be exhausted from the lower end thereof.

Referring, now, to Fig. 12, it will be seen that the valve 139 is formed to provide an inlet port 150 opening into an interior chamber 151 surrounding a cylindrical liner 153 which is formed with a series of ports 152 and with another series of ports 152', axially spaced from said first series, providing communication between the chamber 151 and the interior of said liner. The valve is further formed with a delivery port 154 opening into a chamber 155 with which registers a series of ports 156 in the liner 153. A second delivery port 157 opens into a chamber 158 registering with a series of ports 159 opening into the interior of the liner.

Reciprocably mounted in the valve housing and extending coaxially through the liner is a shiftable element 160 which carries a plurality of sealing gaskets 161, 162, 163 and 164 so spaced that, when the element 160 is in its neutral position, the heads 161 and 162 are disposed on opposite sides of the ports 156, the heads 162 and 163 are disposed on opposite sides of the ports 152 and 152', and the heads 163 and 164 are disposed on opposite sides of the ports 159, whereby flow between the several chambers is prevented.

At the left-hand end of the element 160, there is carried a piston comprising a sealing head or gasket 165 reciprocable in a sleeve 166 and held in place by a block 167 against the outer end of which bears a spring seat 168 resiliently urged toward the right by a spring 169. This piston comprises an element of the pilot motor 144; and it will be seen that the spring 169 normally holds the spring seat 168, and therefore the piston, in the position of Fig. 12.

Similarly, at its opposite end, the element 160 carries a piston 170 slidably received in a sleeve 171 and including a block 172 against which bears a spring seat 173 urged toward the left by a spring 174, this structure comprising the pilot motor 145.

An exhaust port 175 communicates with a chamber 176 with which the opposite open ends of the liner 153 are in open communication.

When the valves 146 and 147 are closed, the springs 169 and 174 cooperate to hold the shiftable member 160 in its illustrated, neutral position. It will be seen that, in that position, the heads 161, 162, 163 and 164 seal the chambers 155 and 158 against communication with either of the chambers 151 and 176, thus sealing both ends of the cylinder 78 to hold the piston rod 79 (and so, the carriage 49) in its current position. When, however, the valve 146 is opened, fluid under pressure will flow through the conduit 148 into the motor 144 and will act upon the head 165 to shift the element 160 to the right against the tendency of the spring 174, the spring seat 168 remaining in its illustrated position, but the spring seat 173 being shifted to the right by the engagement of the block 172 therewith.

Such movement of the element 160 shifts the head 163 to the right beyond the ports 159, shifts the head 162 to a position between the ports 152 and 152', and shifts the head 161 to a position between the ports 152 and 156. Thus, communication is established, through the interior of the liner 153, between the ports 152' and the ports 159, whereby fluid under pressure may flow through the chamber 158, port 157 and conduit 141 to the lower end of the cylinder 78. At the same time, the ports 156 are opened, through the interior of the liner 153 and its open, left-hand end, to the interior of the exhaust chamber 176, whereby fluid may flow from the upper end of the cylinder 78, through the conduit 140, port 154, chamber 155, ports 156 and chamber 176 to and through the exhaust port 175. Immediately upon closure of the valve 146, the spring 174 will return the element 160 to its illustrated position.

In the same way, when the valve 147 is opened, the piston 170 will be forced to shift the element 160 to the left, thereby establishing communication between the ports 152 and 156, and opening the ports 159 to the exhaust chamber 176, whereby fluid will be supplied to the upper end of the cylinder 78 and will be exhausted from the lower end thereof.

Figure 13:
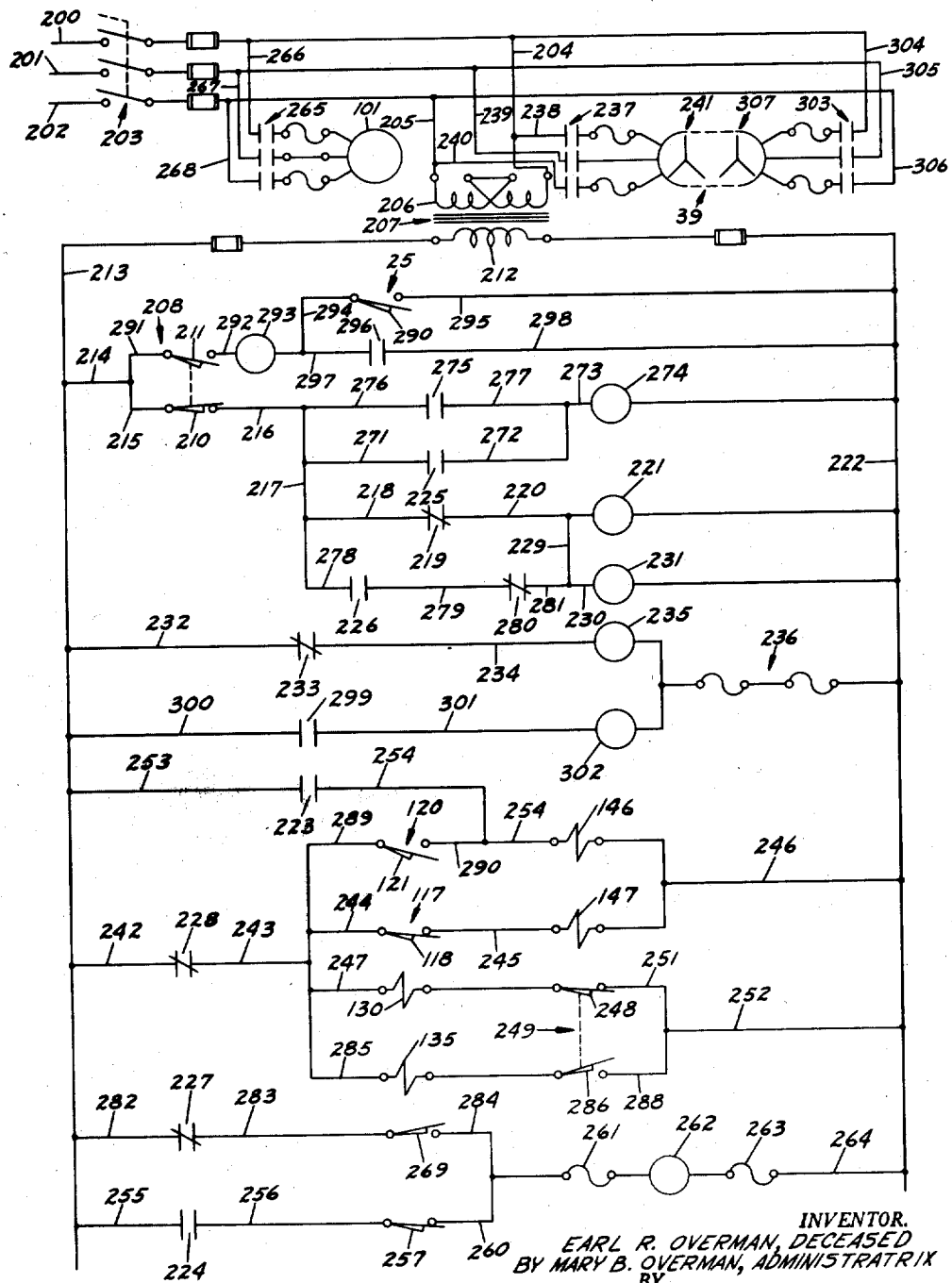
Fig. 13 is a wiring diagram.

Referring, now, to Fig. 13, it will be seen that I have indicated a source of electrical energy in the three line wires 200, 201 and 202. When the fuse disconnect switch 203 is closed, current will flow through wires 204 and 205 to energize the primary coil 206 of the transformer 207, thus inducing current in the transformer secondary 212.

Assuming that the entire system, as illustrated in Fig. 1, is just being started, there will be no material under the paddle 209 of switch 208 mounted near the distal end of the conveyor 30. The switch 208 includes a pair of contact arms 210 and 211; and, when the paddle 209 is in its illustrated position, the arm 210 will be in closed position and the arm 211 will be in open position. The arrangement is such that the roll-up mechanism will go through a complete cycle before a piece of work is fed to it.

Immediately upon energization of the transformer 207, a circuit will be energized from coil 212 through wire 213, wire 214, wire 215, switch arm 210, wire 216, wire 217, wire 218, normally closed switch 219, wire 220 and relay coil 221, through wire 222 back to the transformer. Relay coil 221 controls normally open switches 223, 224, 225 and 226 and normally closed switches 227 and 228.

At the same time, a circuit is estabilshed from the transformer through wire 213, wire 214, wire 215, switch arm 210, wire 216, wire 217, wire 218, normally closed switch 219, wire 220, wire 229, wire 230, the coil of time delay relay 231 and wire 222 back to the transformer.

At the same time, a circuit is established from the transformer through wire 213, wire 232, normally closed switch 233, wire 234, coil 235, overloads 236 and wire 222 back to the transformer. The coil 235 dominates motor starter switch 237 and, upon energization, closes that switch to allow current to flow through wires 238, 239 and 240 to the low speed winding 241 of motor 39. Thus, the live roll conveyors 27 and 30 and the pressure assembly associated with the mandrel are put into low speed operation.

At the same time, a further circuit is established from the transformer 212 through wire 213, wire 242, normally closed switch 228, wire 243, wire 244, contact arm 118 of switch 117, wire 245, the energizing coil for valve 147, wire 246 and wire 222 back to the transformer. Energization of the coil of valve 147 opens that valve to shift the element 160, as above described, to supply air to the upper end of cylinder 78 and exhaust air from the lower end thereof. Thus, the carriage 49 will be moved downwardly and the distal end of the conveyor 30 will be moved correspondingly upwardly toward the horizontal plane including the axis of the mandrel 81.

At the same time, a further circuit is established from the transformer 212 through wire 213, wire 242, normally closed switch 228, wire 243, wire 247, energizing coil of valve 130, switch arm 248 of limit switch 249, wire 251, wire 252 and wire 222 back to the transformer. Switch 249 (see Fig. 4) is mounted on the machine frame and includes an arm 250 engaged by one of the racks 80 whenever the carriage 49 is above an intermediate position in its path. Such engagement of the arm 250 by the rack 80 will shift the switch 249 from its position illustrated in Fig. 13 to a position in which arm 248 is open and arms 286 are closed. The just-described circuit through the switch arm 248, energizing the coil of valve 130 opens that valve to allow high pressure air to flow to the motor 109 to drive the mandrel 81 with relatively high power.

Energization of coil 221 opens normally closed switch 228 to break the above-described circuits through the energizing coil of valve 147 and through the energizing coil of valve 130. At the same time, energization of the coil 221 closes normally open switch 223, which establishes a circuit from transformer 212 through wire 213, wire 253, switch 223, wire 254 and energizing coil of valve 146, and thence through wires 246 and 222 back to the transformer. Valve 146 is thus opened to shift the element 160 to the right to supply fluid under pressure to the lower end of cylinder 78 and to exhaust the upper end thereof, moving the carriage 49 and the distal end of the conveyor 30 away from the horizontal plane including the axis of the mandrel 81.

Energization of the coil 221 also closes switch 224 to establish a circuit from the transformer 212 through wire 213, wire 255, switch 224, wire 256, switch 257, wire 260, overload 261, coil 262, overload 263 and wires 264 and 222 back to the transformer. Coil 262 dominates motor starter switch 265 which, when closed, permits current to flow through wires 266, 267 and 268 to the winding of carriage-driving motor 101.

Figure 5:
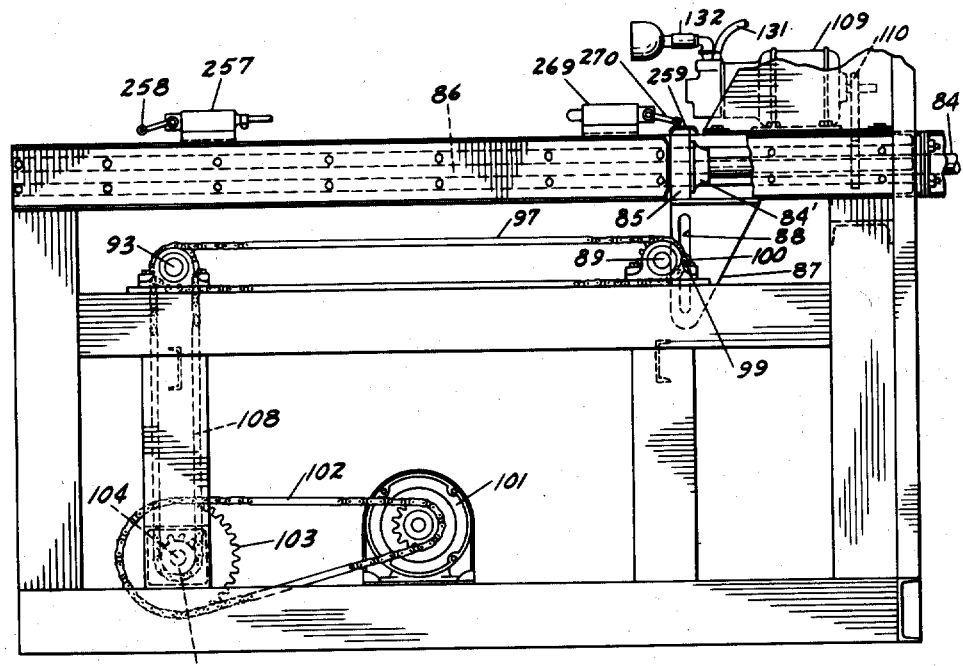
Fig. 5 is an elevation taken from the same viewpoint as Fig. 4 but showing the mandrel-reciprocating mechanism.
Figure 6:
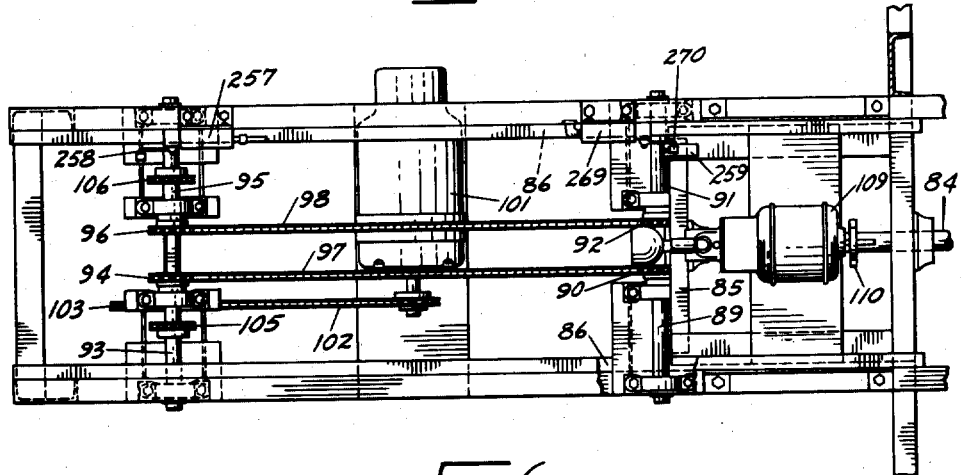
Fig. 6 is a plan view of the structure illustrated in Fig. 5.

Referring, now, to Fig. 5, it will be seen that the switch 257 is mounted at the left-hand end of the trackway 86 and includes an actuating arm 258 which, except when it is engaged by actuator 259 carried on the carriage 85, is disposed in switch-closing position. When the motor starter switch 265 is closed, as above-described, the motor 101 will be energized to drive the chains 97 and 98 to move the carriage 85 toward the left, as viewed in Fig. 5; and the motor 101 will continue thus to operate until the actuator 259 engages the arm 258 of switch 257 to open switch 257, thus breaking the energizing circuit for the coil 262, as above-described, whereby the switch 265 will be opened to stop the motor 101. Thereby, the mandrel 81 will be moved completely out of operative registry with the conveyor 30 and the upper drive or presser mechanism supported from the carriage 49.

At the right-hand end of the trackway 86 there is mounted a further switch 269 having an actuating arm 270 which, except when it is engaged by the actuator 259, is disposed in switch-closing position. Thus, as the carriage 85 begins to move toward the left, as above-described, the switch 269 will be closed; but closure of that switch will not establish any circuit, so long as the coil 221 is energized, since energization of that coil opens normally closed switch 227.

Energization of coil 221 also closes normally open switch 225 to establish a circuit from the transformer 212 through wire 213, wire 214, wire 215, switch arm 210, wire 216, wire 217, wire 271, switch 225, wire 272, wire 273 and coil 274 to wire 222 and back to transformer 212. Energization of relay coil 274 closes normally open switch 275 and opens normally closed switch 219. Closure of switch 275 establishes a holding circuit for coil 274 traced from transformer 212 through wire 213, wire 214, wire 215, switch arm 210, wire 216, wire 276, switch 275, wire 277, wire 273, coil 274 and wire 222 back to the transformer. Opening switch 219 does not immediately deenergize coils 221 and 231, since relay coil 221 is holding switch 226 closed to maintain holding circuits for said coils from the transformer 212 through wire 213, wire 214, wire 215, switch arm 210, wire 216, wire 217, wire 278, switch 226, wire 279, normally closed switch 280 of the time delay relay 231, and wire 281 to wires 229 and 230. However, both holding circuits for the coils 221 and 231 are dominated by the switch 280 so that, once the time delay relay (which is a conventional pneumatic unit in which the switch 280 is normally closed but will be opened at the expiration of a predetermined time after energization of the coil 231) acts, coil 221 cannot again be energized until after deenergization of coil 274 by lifting, and subsequent dropping, of the paddle 209 of switch 208, as described hereinafter.

When the coil 221 is deenergized, by operation of the time delay relay to open switch 280, switch 227 is reclosed. It will be remembered that the carriage 85 has previously traveled from its position illustrated in Fig. 5 to the opposite end of its path so that, now, switch 257 is open and switch 269 is closed. Thus, reclosure of switch 227 upon deenergization of coil 221 will establish a circuit from transformer 212 through wire 213, wire 282, switch 227, wire 283, switch 269, wire 284, the overloads and the coil 262, wire 264 and wire 222 back to the transformer to reclose motor starter switch 265 to reenergize motor 101. Thereby, the carriage 85 will be moved from the left-hand end of its path toward the right; and, as the actuator 259 engages the arm 270 of switch 269, the motor will be deenergized to stop the carriage 85 in its illustrated position.

Deenergization of coil 221 also results in reclosure of switch 228. Since there is no material on the mandrel at this time, the arm 112 is in the position of Fig. 8, holding switch 117 closed; and therefore reclosure of the switch 228 establishes a circuit from transformer 212 through wire 213, wire 242, switch 228, wire 243, wire 244, switch 117, wire 245, energizing coil of valve 147, wire 246 and wire 222 back to the transformer. As before, energization of the coil of valve 147 results in the delivery of air under pressure to the upper end of motor cylinder 78 and the exhaust of air from the lower end thereof to move the upper and lower material-driving systems toward the horizontal plane including the axis of the mandrel 81, thus putting the roll-up mechanism into condition to receive a piece of material to be rolled.

It will be remembered that, before the time delay relay opened the switch 280, the carriage 49 was at its uppermost position, whereby the rack 80 was in engagement with the actuating arm 250 of switch 249 to hold the switch arm 286 in closed position. Thus, when deenergization of the coil 221 permitted reclosure of switch 228, a circuit was established from the transformer 212 through wire 213, wire 242, switch 228, wire 243, wire 285, energizing coil of valve 135, switch arm 286, wire 288, wire 252 and wire 222 back to the transformer 212. Energization of the coil of valve 135 opens that valve to permit air to flow, through conduit 133 and regulator 134, at low pressure to the mandrel-driving motor 109. However, as the carriage 49 descends, the rack 80 loses contact with the switch actuating arm 250, whereby the switch arms 248 and 286 will be moved to their positions illustrated in Fig. 13, thus breaking the energizing circuit for the coil of valve 135 and establishing an energizing circuit for the coil of valve 130. Thereafter, air at higher pressure flows through pipe 129, valve 130 and conduit 131 to the mandrel-driving motor 109 to drive the mandrel at a peripheral velocity substantially equal to the lineal velocity at which the upper and lower material-driving units are operating.

Meantime, a piece 21' of material has been severed from the advancing stream 21 and has been delivered, by the conveyor 27, to the conveyor 30. The leading edge of that piece of material now passes beneath the paddle 209 of switch 208 to lift the switch arms 210 and 211, thus breaking the holding circuit for relay coil 274. No circuit is closed by such actuation of the switch 208, since switches are open at 296 and at 290.

As the leading end of the piece 21' continues down the conveyor 30, it engages the belts 43 which lift and direct it into contact with the belts 72. The carriage 49 being at the lowermost end of its stroke, and the distal end of the conveyor 30 being at its uppermost position, the material now comes into contact with the rotating mandrel; and a combination of the driving power of the mandrel and of the belts 43, 72 and 75 causes the material to continue on around the mandrel and to begin to wind itself thereon without assistance from the operator or attendant of the machine.

Figure 8:
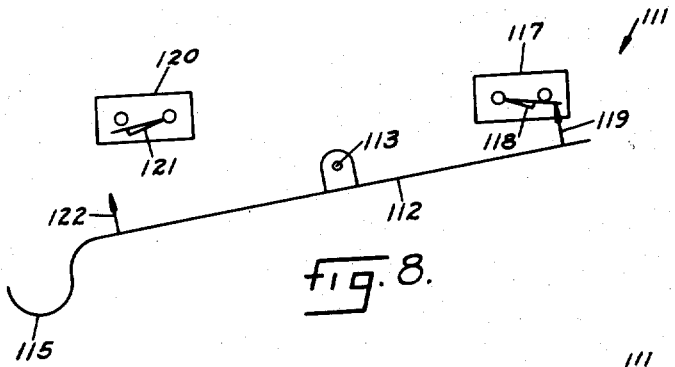
Figs. 8, 9 and 10 are diagrammatic illustrations of a feeler mechanism constituting an element of the control for the presser and material driving means, in successive positions.
Figure 9:
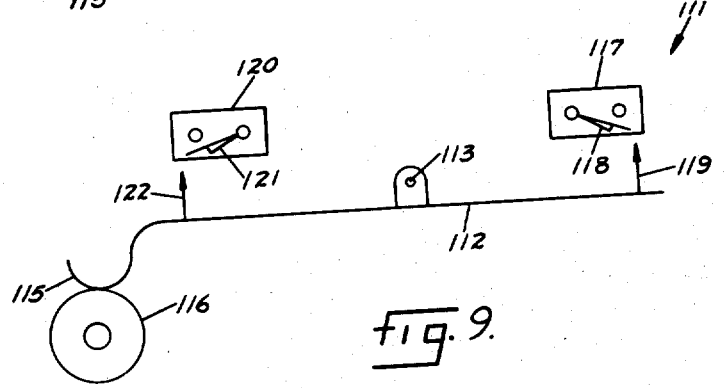
Figure 10:
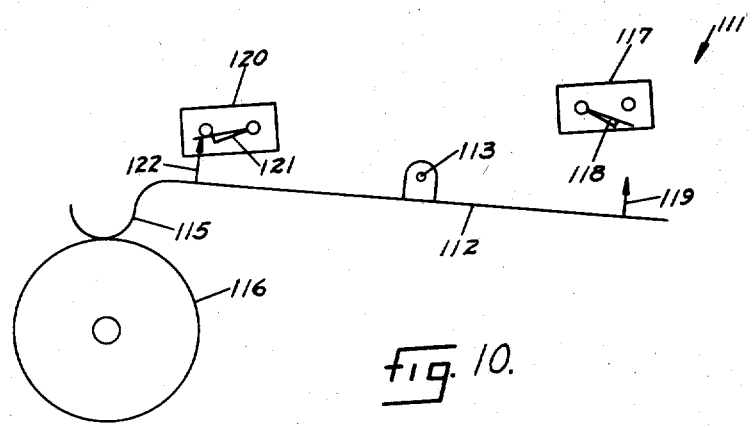

As the roll of material increases in diameter (or in thickness) upon the mandrel, it comes into contact with the end 115 of the sensing arm 112 and begins to move it from the position of Fig. 8 to the position of Fig. 9. During such movement, the finger 119 leaves the arm 118 of the switch 117 to permit that switch to open, thereby breaking the circuit through the energizing coil for the valve 147, whereby the shiftable element 160 of the valve 139 will be returned to its neutral position to seal both ends of the cylinder 78 against fluid flow. As the thickness of material on the mandrel continues to grow, however, the arm 112 will ultimately be moved to the position of Fig. 10, closing switch 120 to establish a circuit from the transformer 212 through wire 213, wire 242, normally closed switch 228, wire 243, wire 289, switch 120, wire 290, wire 254, energizing coil for valve 146, wire 246 and wire 222 back to the transformer. Thereby, valve 146 will be opened to supply air to the pilot motor 144 to shift the element 160 of the valve 139 toward the right. Thus, fluid is supplied to the lower end of cylinder 78 and exhausted from the upper end thereof whereby the carriage 49 is moved upwardly and the distal end of the conveyor 30 is moved correspondingly downwardly. Since the sensing arm 112 is carried upon the carriage 49, such movement of the carriage soon returns the arm 112 to the position of Fig. 9, opening switch 120. The valve 139 is thereby returned to its neutral position, to stop the carriage 49 and the conveyor 30 in their new positions; and this operation is repeated, step by step, as the thickness of material on the mandrel continues to grow, whereby substantially uniform pressure of the belts 43, 72 and 75 upon the external surface of the material is maintained.

When the carriage 49 has moved upwardly through substantially one-half its stroke, the rack 80 again engages the actuating arm 250 of the switch 249 to return the arms 248 and 286 thereof to their positions opposite that illustrated in Fig. 13. Thereby, the coil of valve 130 is deenergized and the coil of valve 135 is energized. High pressure air is thus cut off from the motor 109 and low pressure air is fed to the motor. The regulator 134 is so set that, throughout the remainder of the winding cycle, the mandrel 81 is driven by a force only sufficient to avoid any hold-back tendency of the mandrel upon the material, without the exertion of any driving force upon the material by the mandrel.

At some suitable time before the trailing end of the piece being wound has passed the paddle 209 of the switch 208, the cut-off mechanism 24 will be actuated to sever another piece from the advancing stream of material; and, as the cut-off mechanism completes its cycle, the actuating arm 26 of the switch 25 will be operated, as described heretofore, to close the switch 25 momentarily. It will be remembered that, at this instant, the paddle 209 is holding the switch arm 211 of the switch 208 in closed position so that, when the contact arm 290 of the switch 25 is momentarily moved to closed position by the return of the cut-off mechanism, a circuit is established from the transformer 212 through wire 213, wire 214, wire 291, switch arm 211, wire 292, relay coil 293, wire 294, switch 25, wire 295 and wire 222 back to the transformer 212. Energization of coil 293 closes normally open switch 296 to establish a holding circuit through coil 293, independent of the switch 25, through wire 297, switch 296, wire 298 and wire 222 back to the transformer.

Energization of coil 293 also opens normally closed switch 233 and closes normally open switch 299. Thus, the above-described circuit, through switch 233, energizing the low speed winding 241 of the motor 39 is broken, and a circuit is established from the transformer 212 through wire 213, wire 300, switch 299, wire 301, coil 302, overload 236 and wire 222 back to the transformer. Energization of the coil 302 closes the motor starter switch 303 to supply current, through wires 304, 305 and 306, to the high speed winding 307 of the motor 39. Thereby, said motor is accelerated to speed up the operation of the conveyors 27 and 30 and of the belts 43, 72 and 75. Thus, the newly-severed piece of material is caused to run away from the advancing main stream 21 in order to provide time (after the next rol'ing operation which will be performed upon that piece) for the discharging operation now to be described. Where the wrapping mechanism 28 is used, this acceleration further provides time for the wrapping operation to take place.

Shortly after the above-described action, initiated by operation of the cut-off mechanism, the trailing end of the piece 21', currently being rolled, passes beneath the paddle 209 of the switch 208 to permit that paddle to drop, whereby the contact arms 210 and 211 of the switch 208 return to the positions illustrated in Fig. 13. Thus, the energizing circuit for the coil 293 is broken at 211 and the switch 299 is reopened and the switch 233 is reclosed, whereby the motor 39 is returned to normal speed operation.

At the same time, a circuit is established, as above-described, through the switches 210 and 219 to energize coil 221 while another circuit is established, through the wires 229 and 230, to energize the time delay relay coil 231. It will be remembered that energization of coil 221 closes normally open switches 223, 224, 225 and 226, and opens normally closed switches 227 and 228. In the manner above-described, closure of switch 223 results in shifting the valve 139 to supply fluid under pressure to the lower end of motor cylinder 78 and to exhaust fluid from the upper end thereof to move the carriage 49 and the distal end of the conveyor 30 to the limits of their movements away from the horizontal plane including the axis of the mandrel 81. Thus, the conveyor end is moved out from beneath the completed roll of material so that, when the mandrel 81 is retracted, the roll of material may fall free to be discharged from the machine.

Closure of the switch 224 energizes the carriage drive motor 101, as above-described, to retract the mandrel 81 which will move to the left until the pin 99 has moved half way around the sprockets 94 and 96 and the actuator 259 engages the arm 258 to open switch 257. As the mandrel is thus retracted, the roll of material supported thereon will drop free to be discharged from the machine.

Closure of switch 225 results in energization of relay coil 274 to close switch 275 and to open switch 219, thus providing a holding circuit for the coil 274 and breaking the original energizing circuits for coils 221 and 231, whose energization is maintained, however, through switch 226 which was closed upon energization of coil 221. Those circuits, however, are dependent upon switch 280 which, it will be remembered, will be opened, after a predetermined time, by action of the time delay relay 231.

When the switch 280 is thus opened, the coils 221 and 231 will be deenergized, whereby the switches 223, 224, 225 and 226 will be reopened and the switches 227 and 228 will be reclosed. Since the switch 269 was closed when the actuator 259 departed from engagement with its arm 270, the motor 101 will thus be energized to return the mandrel to cooperative registry with the conveyor 30 and the carriage 49. Movement of the mandrel will, of course, be stopped when the carriage 85 reaches the right-hand limit of its stroke and the actuator 259 re-engages the actuating arm 270 to open the switch 269. Preferably, an electrically-actuated brake (not shown) will be provided to prevent coasting of the carriage and its actuating mechanism.

Closure of the switch 228 energizes the actuating coil of the valve 147 whereby the valve 139 will be actuated to supply fluid under pressure to the top of motor cylinder 78 and to exhaust air from the bottom thereof, whereby the carriage 49 and the distal end of the conveyor 30 will be moved toward the horizontal plane including the axis of the mandrel 81, to bring those parts into positions to start the rolling of the next advancing piece of material.

When the switch 228 is thus closed, the actuating coil of valve 135 is energized, through the switch arm 286 (which is held closed by the rack 80 when the carriage 49 is above substantially the midpoint of its stroke) to supply low pressure air to the fluid motor 109. However, when the rack 80 disengages the actuating arm 250 of the switch 249, that switch will move to the position illustrated in Fig. 13 so that, before the conveyor 30 and the carriage 49 reach their starting positions, the energizing coil for the valve 135 will be deenergized and the energizing coil for the valve 130 will be energized, through the switch arm 248, to supply high pressure air to the motor 109 so that, as the advancing piece of material enters the roll-up mechanism, the mandrel 81 will be rotating at a peripheral velocity substantially equal to the lineal speed of the advancing piece of material.

Now, as the leading edge of that piece engages and lifts the paddle 209 of the switch 208, the above-described operating cycle will be reinitiated.

I claim as my invention:

1. In a roll-up machine, a mandrel, bearing means supporting said mandrel for rotation about a fixed horizontal axis, a conveyor including a section having one end pivotally supported upon an axis parallel with, but spaced from, said mandrel and having its other end disposed in cooperative relation with said mandrel beneath, and projecting beyond, the axis of said mandrel, said last-named end of said conveyor section being upturned toward the horizontal plane including said mandrel axis to guide and transport a length of flexible material toward said mandrel, presser means suspended above said mandrel axis and including portions extending downwardly and laterally oppositely from the vertical plane including said mandrel axis for driving engagement with a portion of such length of material wound on said mandrel, and means for driving said conveyor to transport material supported thereon in a direction from said pivotally supported end of said conveyor toward the other end thereof.

2. The machine of claim 1 in which said presser means comprises a shaft disposed substantially in said vertical plane, each of said portions including a further shaft bodily oscillatable about the axis of said first-named shaft, a series of belts trained over said first-named shaft and one of said further shafts, a series of belts trained over said first-named shaft and the other of said further shafts, and means for driving said shafts and belts so that the reaches of said belts presented toward said conveyor travel, substantially at the velocity of material on said conveyor, in a direction generally opposite the direction of travel of material on said conveyor.

3. The machine of claim 1 including motor means for driving said mandrel at a peripheral velocity substantially equal to the lineal velocity of said conveyor.

4. The machine of claim 3 in which said motor means is a pneumatic motor.

5. The machine of claim 4 including control means for said motor constructed and arranged to cause operation of said motor, at times, to drive said mandrel at a peripheral velocity substantially equal to the lineal velocity of said conveyor, and at other times, to drive said mandrel at a substantially lower velocity.

6. In a roll-up machine, a mandrel, bearing means supporting said mandrel for rotation about a fixed horizontal axis, a conveyor including a section having one end pivotally supported upon an axis parallel with, but spaced from, said mandrel and having its other end disposed beneath, and projecting beyond, the axis of said mandrel, said last-named end of said conveyor section being upturned toward the horizontal plane including said mandrel axis, presser means suspended above said mandrel axis and including portions extending downwardly and laterally oppositely from the vertical plane including said mandrel axis, means for driving said conveyor to transport material supported thereon in a direction from said pivotally supported end of said conveyor toward the other end thereof, means guiding said presser means for movement toward and away from said horizontal plane, motor means for shifting said presser means along said guiding means, and means providing an operative connection between said presser means and said other end of said conveyor to shift said other conveyor end equally and oppositely relative to said horizontal plane in response to movement of said presser means.

7. The machine of claim 6 including control means for said motor and means responsive to the growth of material on said mandrel to actuate said control means to energize said motor to shift said presser means and said other conveyor end away from said horizontal plane as material builds up on said mandrel.

8. The machine of claim 7 in which said control means includes a feeler supported to move with said presser means and having a portion disposed to bear upon the material building up on said mandrel, said feeler being movable relative to said presser means in response to the growth of material on said mandrel, and an electric switch dominated by said feeler and actuated thereby, upon growth of such material to a predetermined degree, to energize said motor.

9. The machine of claim 1 in which said mandrel is mounted for axial reciprocation, motor-driven means for axially shifting said mandrel between a position in cooperative registry with said conveyor and said presser means and a position completely out of such registry, and automatic means, responsive to a change in a condition of the material moving through the machine with respect to the machine parts, to activate said motor-driven means to withdraw said mandrel from such registry.

10. The machine of claim 1 in which said mandrel is mounted for axial reciprocation, a carriage supporting one end of said mandrel, a trackway for said carriage coaxial with said mandrel and extending beyond said one end away from said conveyor, said carriage being formed to provide a guide transverse with respect to said trackway, a slide operatively engaged in said guide, an endless element having substantially parallel runs paralleling said trackway, said slide being operatively connected with said endless element, motor means for driving said endless element, and means, responsive to a change in a condition of the material moving through the machine with respect to the machine parts, to energize said motor means to shift said mandrel from a position in cooperative registry with said presser means and said conveyor other end to a position completely out of such registry.

11. In a machine of the class described, a mandrel, bearing means for one end of said mandrel, bearing means for the other end of said mandrel, intermediate bearing means through which said mandrel is axially slidable, a trackway extending beyond said intermediate bearing means away from said first-named bearing means, a carriage supported to move on said trackway, said second-named bearing means being axially fixed with respect to said mandrel and being mounted on said carriage, a pair of parallel shafts mounted adjacent the opposite ends of said trackway on axes transverse with respect to said trackway, an endless member trained over said shafts and drivingly connected with at least one of said shafts, said carriage being provided with a guide transverse with respect to said trackway and to said shafts, a slide operatively engaged in said guide and having a driving connection with said endless member, and means for driving said one shaft.

12. The structure of claim 11 in which said driving means comprises a motor, a first switch adjacent one end of said trackway, a second switch adjacent the other end of said trackway, a first circuit effective to actuate said motor and including said second switch, a second circuit effective to actuate said motor and including said first switch, and means moving with said carriage and effective to hold said first switch open when said carriage is at said one end of said trackway and to hold said second switch open when said carriage is at said other end of said trackway.

13. In a machine of the class described, a first continuously-driven conveyor means for advancing a continuous stream of material, a second continuously-driven conveyor means positioned to receive and advance material from said first conveyor means, cut-off means positioned substantially at the juncture of said first and second conveyor means, means for actuating said cut-off means, means actuated upon completion of the cycle of said cut-off means to accelerate said second conveyor means to a lineal velocity exceeding that of said first conveyor means, material roll-up means positioned to receive material from said second conveyor means and driven at a constant ratio with respect to said second conveyor means, and means positioned substantially at the point of delivery of material from said second conveyor means to said roll-up means to sense the completion of delivery of a piece of material to said roll-up means and thereupon to decelerate said second conveyor means to a lineal velocity substantially equal to that of said first conveyor means.

14. In a machine of the class described, a first live-roll conveyor for advancing a continuous stream of material, means for driving the rolls of said conveyor, a second live-roll conveyor arranged to receive and advance material from said first conveyor, material roll-up means including a third live-roll conveyor arranged to receive material from said second conveyor, means for driving the rolls of said second conveyor and said roll-up means including the rolls of said third conveyor, material cut-off means positioned substantially at the point of delivery of material from said first conveyor to said second conveyor, means for actuating said cut-off means to sever a piece from the leading end of said stream of material, means actuated upon completion of the cycle of said cut-off means to accelerate the driving means for said second conveyor and said roll-up means, and means positioned substantially at the point of delivery of material from said third conveyor to sense the passage of the trailing end of a piece of material and thereupon to decelerate the driving means for said second conveyor and said roll-up means.

15. In a material roll-up machine, a mandrel mounted for rotation upon a substantially horizontal axis, a conveyor comprising a frame mounted for swinging movement about an axis parallel with said mandrel axis but laterally offset therefrom, said frame projecting to and beyond the vertical plane including said mandrel axis and having its end remote from its swinging axis disposed below the horizontal plane including said mandrel axis, live rolls carried by said frame, a pair of shafts, parallel with said rolls, journalled at said remote end of said frame, that one of said shafts more remote from said swinging axis being disposed at a level above that of the other of said shafts, a series of belts trained over said shafts in axially-spaced relation and drivingly connected with at least one of said shafts, common means for driving said live rolls and said one shaft, a substantially vertically arranged guideway straddling the remote end of said conveyor, a carriage mounted for reciprocation in said guideway vertically above said mandrel toward and away from said mandrel, presser means carried by said carriage and projecting therefrom downwardly and to opposite sides of said vertical plane, means for shifting said carriage toward and away from said mandrel, a pair of flexible members secured to said carriage adjacent opposite ends thereof, passing over rotatable elements supported above said carriage, and secured to said conveyor frame adjacent the remote end thereof, and a pair of flexible members secured to said carriage adjacent opposite ends thereof, passing under rotatable elements supported below said conveyor frame, and secured to said conveyor frame adjacent the remote end thereof, whereby movement of said carriage along said guideway toward or away from said mandrel produces corresponding movement of said remote end of said conveyor frame toward or away from said mandrel.

16. In a material roll-up machine, a mandrel mounted for rotation upon a substantially horizontal axis, a conveyor comprising a frame mounted for swinging movement about an axis parallel with said mandrel axis but laterally offset therefrom, said frame projecting to and beyond the vertical plane including said mandrel axis and having its end remote from its swinging axis disposed below the horizontal plane including said mandrel axis, live rolls carried by said frame, a first shaft and a second shaft, parallel with said rolls, journalled at said remote end of said frame, that one of said shafts more remote from said swinging axis being disposed at a level above that of the other of said shafts, a series of belts trained over said shafts in axially-spaced relation and drivingly connected with at least one of said shafts, common means for driving said live rolls and said one shaft, a substantially vertically arranged guideway straddling the remote end of said conveyor, a carriage mounted for reciprocation in said guideway vertically above said mandrel toward and away from said mandrel, means for shifting said carriage toward and away from said mandrel, a pair of flexible members secured to said carriage adjacent opposite ends thereof, passing over rotatable elements supported above said carriage, and secured to said conveyor frame adjacent the remote end thereof, and a pair of flexible members secured to said carriage adjacent opposite ends thereof, passing under rotatable elements supported below said conveyor frame, and secured to said conveyor frame adjacent the remote end thereof, whereby movement of said carriage along said guideway toward or away from said mandrel produces corresponding movement of said remote end of said conveyor frame toward or away from said mandrel, and presser means carried by said carriage and comprising a third shaft journalled in said carriage upon an axis parallel with said mandrel axis and substantially in said vertical plane, a first auxiliary frame mounted for oscillation about the axis of said third shaft and projecting downwardly and to one side of said vertical plane, a fourth shaft journalled in said auxiliary frame adjacent the distal end thereof, a series of belts trained over said third and fourth shafts in axially-spaced relation and drivingly connected with said third shaft, a second auxiliary frame mounted for oscillation about the axis of said third shaft and projecting downwardly and to the opposite side of said vertical plane, a fifth shaft journalled in said second auxiliary frame adjacent the distal end thereof, a series of belts trained over said third and fifth shafts in axially-spaced relation and drivingly connected with said third shaft, and means for driving said third shaft from said common means, regardless of the position of said carriage along said guideway comprising a sprocket fixed to said third shaft, a pair of sprockets mounted on fixed axes above the uppermost position of said carriage and on opposite sides of said vertical plane, a pair of sprockets mounted on fixed axes below the lowermost position of said carriage and on opposite sides of said vertical plane, an endless chain trained about said two pairs of sprockets and having a reach meshing also with said first-named sprockets, and means providing a driving connection between said common driving means and said chain.

17. In a material roll-up machine, a mandrel mounted for rotation about a substantially horizontal axis, and means for rolling a length of material upon said mandrel by externally driving the material comprising a lower material-driving means disposed below the mandrel axis and including a downwardly-inclined portion on one side of the vertical plane including the mandrel axis and an upwardly-inclined portion on the other side of said plane, and an upper material-driving means disposed above the mandrel axis and including an inclined, downwardly-moving portion on the first-named side of said plane and an inclined, upwardly-moving portion on the second-named side of said plane, a fluid motor including a cylinder and a piston reciprocable in said cylinder and operatively connected to said lower and upper driving means and operable in one direction to move both driving means away from the horizontal plane including said mandrel axis and in the opposite direction to move both driving means toward said horizontal plane, and control means for said fluid motor comprising a source of fluid under pressure, a main valve including a shiftable member having a neutral position in which it seals both ends of said cylinder against fluid flow, a "down" position in which it opens the upper end of said cylinder to said source and opens the lower end of said cylinder to exhaust, and an "up" position in which it opens the lower end of said cylinder to said source and opens the upper end of said cylinder to exhaust, spring means operatively associated with said shiftable member and resiliently retaining the same in its neutral position, a first pilot fluid motor operable, when fluid under pressure is supplied thereto, to shift said shiftable member to its "down" position, a second pilot fluid motor operable, when fluid under pressure is supplied thereto, to shift said shiftable member to its "up" position, a first, normally-closed, electrically-controlled valve dominating the flow of fluid from said source to said first pilot motor, a second, normally-closed, electrically-controlled valve dominating the flow of fluid from said source to said second pilot motor, an energizing circuit for said first electrically-controlled valve including a first normally-open switch, an energizing circuit for said second electrically-controlled valve including a second normally-open switch, said switches being supported from one of said driving means, and a feeler supported from said one driving means and movable, relative to said switches, in response to variations in the thickness of material on said mandrel, to close said first switch when such thickness is below a predetermined value relative to the position of said driving means, to close said second switch when such thickness is above a predetermined value relative to the position of said driving means, and to leave both switches open when such relative thickness is between such predetermined values.

References Cited in the file of this patent

UNITED STATES PATENTS

| | | |
|---|---|---|
| 1,490,544 | Stern | Apr. 15, 1924 |
| 1,687,928 | Castricum et al. | Oct. 16, 1928 |
| 2,037,348 | Stein | Apr. 14, 1936 |
| 2,593,470 | Matthews et al. | Apr. 22, 1952 |
| 2,651,257 | Thomas et al. | Sept. 8, 1953 |